(12) United States Patent
Ahn

(10) Patent No.: US 12,179,732 B2
(45) Date of Patent: Dec. 31, 2024

(54) BRAKE APPARATUS FOR VEHICLE

(71) Applicant: HYUNDAI MOBIS CO., LTD., Seoul (KR)

(72) Inventor: Sung Ki Ahn, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 382 days.

(21) Appl. No.: 17/726,822

(22) Filed: Apr. 22, 2022

(65) Prior Publication Data

US 2023/0001900 A1 Jan. 5, 2023

(30) Foreign Application Priority Data

Jun. 30, 2021 (KR) .................. 10-2021-0085631

(51) Int. Cl.
| | | |
|---|---|---|
| *B60T 8/32* | (2006.01) | |
| *B60T 7/04* | (2006.01) | |
| *B60T 8/36* | (2006.01) | |
| *B60T 8/40* | (2006.01) | |
| *B60T 8/44* | (2006.01) | |
| *B60T 8/48* | (2006.01) | |
| *B60T 13/58* | (2006.01) | |
| *B60T 15/02* | (2006.01) | |

(52) U.S. Cl.
CPC ............. *B60T 8/326* (2013.01); *B60T 7/042* (2013.01); *B60T 8/367* (2013.01); *B60T 8/4081* (2013.01); *B60T 8/441* (2013.01); *B60T 8/4827* (2013.01); *B60T 13/586* (2013.01); *B60T 15/028* (2013.01); *B60T 2270/602* (2013.01)

(58) Field of Classification Search
CPC .......... B60T 7/042; B60T 8/326; B60T 8/367; B60T 8/441; B60T 8/4081; B60T 8/4827; B60T 13/586; B60T 15/028; B60T 2270/602

See application file for complete search history.

(56) References Cited

U.S. PATENT DOCUMENTS

| | | | | |
|---|---|---|---|---|
| 10,611,348 B2* | 4/2020 | Zipfel | ....................... | B60T 7/12 |
| 11,465,601 B2* | 10/2022 | Koo | ....................... | B60T 13/662 |
| 11,772,623 B2* | 10/2023 | Ahn | ....................... | B60T 13/165 |
| | | | | 303/6.01 |
| 11,912,250 B2* | 2/2024 | Ahn | ....................... | B60T 13/161 |
| 11,919,490 B2* | 3/2024 | Alford | ................... | B60T 8/176 |

(Continued)

*Primary Examiner* — Thomas W Irvin

(74) *Attorney, Agent, or Firm* — Novo TechIP International PLLC

(57) ABSTRACT

The present disclosure in some embodiments provides a brake apparatus for a vehicle, comprising: a reservoir configured to store a working fluid; a master cylinder connected to the reservoir; a hydraulic circuit connected to a wheel brake; a primary brake unit configured to supply a hydraulic pressure to the wheel brake through the hydraulic circuit; and a secondary brake unit configured to supply a hydraulic pressure to the wheel brake through the hydraulic circuit, wherein the hydraulic circuit comprises: a first hydraulic circuit coupled to the reservoir, the master cylinder, and the secondary brake unit; a second hydraulic circuit coupled to the reservoir and the primary brake unit; and a third hydraulic circuit coupled to the primary brake unit, the secondary brake unit, and the wheel brake.

13 Claims, 11 Drawing Sheets

(56) References Cited

U.S. PATENT DOCUMENTS

| | | | | |
|---|---|---|---|---|
| 2014/0203626 A1* | 7/2014 | Biller | ............ | B60T 7/02 |
| | | | | 303/14 |
| 2017/0341630 A1* | 11/2017 | Zipfel | ............ | B60T 8/321 |
| 2019/0016321 A1* | 1/2019 | Dinkel | ............ | B60T 8/4081 |
| 2020/0353910 A1* | 11/2020 | Seol | ............ | B60T 13/142 |
| 2020/0406880 A1* | 12/2020 | Zimmermann | ............ | B60T 17/221 |
| 2021/0053543 A1* | 2/2021 | Seol | ............ | B60T 7/042 |
| 2021/0070262 A1* | 3/2021 | Seol | ............ | B60T 13/145 |
| 2021/0101575 A1* | 4/2021 | Ahn | ............ | B60T 8/326 |
| 2021/0179051 A1* | 6/2021 | Alford | ............ | B60T 13/745 |
| 2022/0194339 A1* | 6/2022 | Tarandek | ............ | B60T 13/145 |
| 2022/0410861 A1* | 12/2022 | Ahn | ............ | B60T 13/662 |
| 2022/0410866 A1* | 12/2022 | Hwang | ............ | B60T 8/3255 |

* cited by examiner

BRAKE APPARATUS FOR VEHICLE

CROSS-REFERENCE TO RELATED APPLICATIONS

The application claims priority to Korean Patent Application No. 10-2021-0085631, filed Jun. 30, 2021, the disclose of which is incorporated herein by reference.

BACKGROUND

1. Technical Field

The present disclosure relates to a brake apparatus for a vehicle. More particularly, the present disclosure relates to a brake apparatus for a vehicle equipped with a secondary brake unit.

2. Discussion of Related Art

The content described in this section merely provides background information on the present disclosure and does not constitute the prior art.

As autonomous driving is developing to a higher level, a driver's intervention is reduced, so it is essential to secure safety technology for emergency situations. Therefore, a vehicle to which an autonomous driving function will be introduced in the future, such as an electric vehicle, should necessarily have a brake function to prepare for emergency situations.

In order to prevent accidents, the vehicle may be equipped with a secondary brake system in addition to a primary brake system. In this case, even if a problem occurs in either of the primary brake system or the secondary brake system, the brake system operated normally performs the brake function of the vehicle, so that it is possible to brake the vehicle by a remaining brake system.

When the secondary brake apparatus is additionally installed, the entire brake apparatus additionally requires eight pipes, thus causing a complicated construction and leading to an increase in weight. Further, the delivery speed of working fluid may be reduced depending on a length of the pipe connecting the main brake system and the secondary brake system. This deteriorates braking response performance.

SUMMARY

In view of the above, the present disclosure provides a brake apparatus for a vehicle, in which a primary brake unit and a secondary brake unit are installed in one pump housing, so that the configuration of the brake apparatus having a redundancy brake function can be simplified, and the weight of the brake apparatus can be reduced.

Furthermore, the present disclosure provides a brake apparatus for a vehicle, in which a primary brake unit and a secondary brake unit are installed in one pump housing, so that a redundancy brake function can be realized and braking response performance is excellent.

The problems to be solved by the present disclosure are not limited to the above-mentioned problems, and other problems which are not mentioned will be clearly understood by those skilled in the art from the following description.

According to at least one embodiment, the present disclosure provides a brake apparatus for a vehicle, comprising: a reservoir configured to store a working fluid; a master cylinder connected to the reservoir; a hydraulic circuit connected to a wheel brake; a primary brake unit configured to supply a hydraulic pressure to the wheel brake through the hydraulic circuit; and a secondary brake unit configured to supply hydraulic pressure to at least one wheel brake through the hydraulic circuit, wherein the hydraulic circuit comprises: a first hydraulic circuit coupled to the reservoir, the master cylinder, and the secondary brake unit; a second hydraulic circuit coupled to the reservoir and the primary brake unit; and a third hydraulic circuit coupled to the primary brake unit, the secondary brake unit, and the wheel brake.

As described above, a brake apparatus for a vehicle according to the present disclosure is advantageous in that a primary brake unit and a secondary brake unit are installed in one pump housing, so that the configuration of the brake apparatus having a redundancy brake function can be simplified, and the weight of the brake apparatus can be reduced.

Furthermore, a brake apparatus for a vehicle according to the present disclosure is advantageous in that a primary brake unit and a secondary brake unit are installed in one pump housing, so that a redundancy brake function can be realized and braking response performance is not deteriorated.

DETAILED DESCRIPTION

Figure 1:
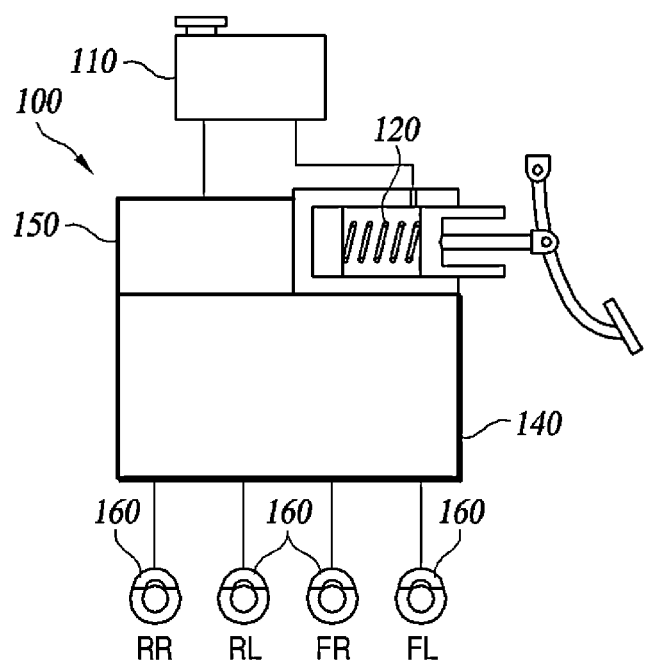
FIG. 1 is a block diagram illustrating a brake apparatus according to an embodiment of the present disclosure.
Figure 2:
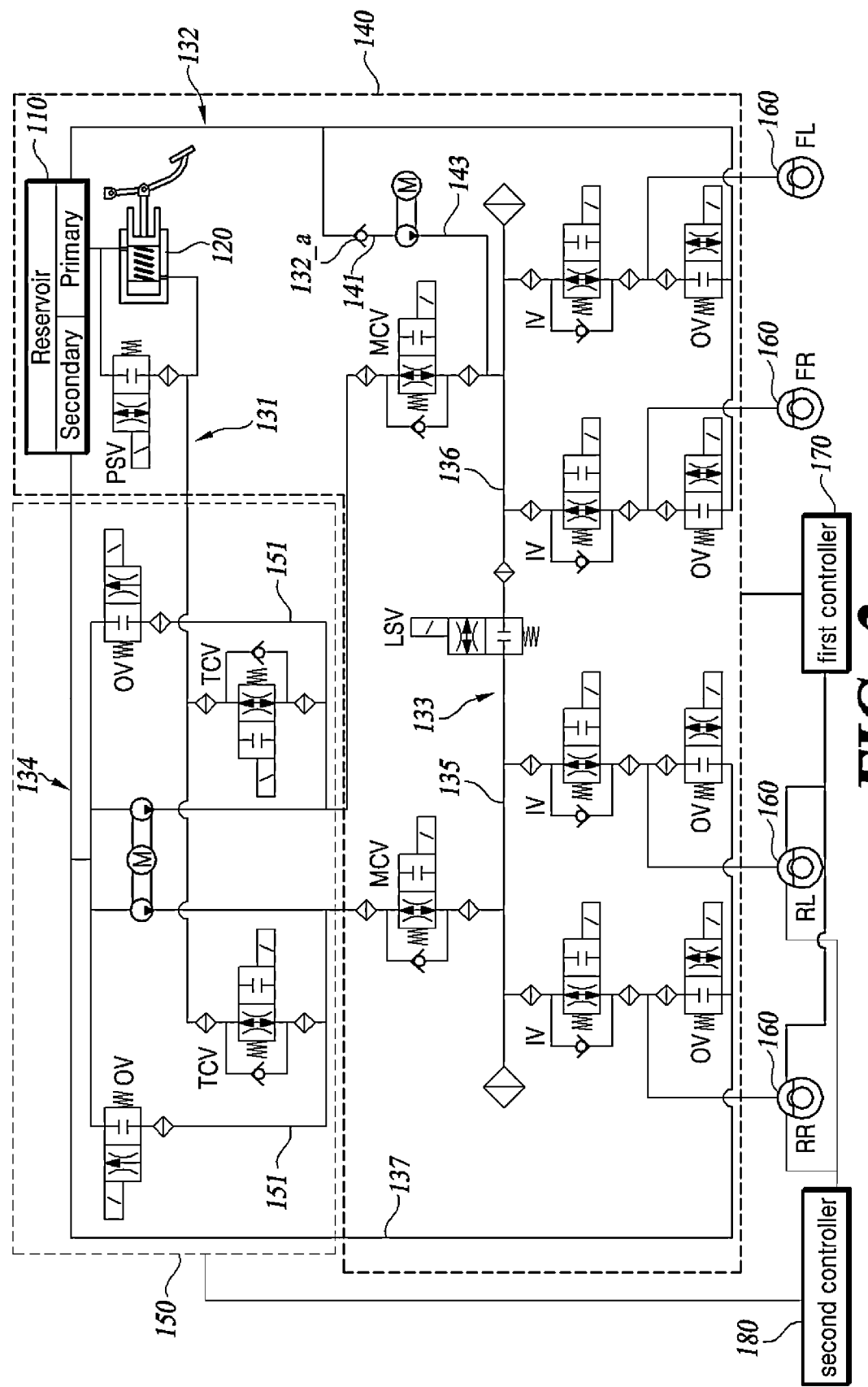
FIG. 2 is a block diagram illustrating a hydraulic circuit of the brake apparatus according to an embodiment of the present disclosure.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

In the present disclosure, as for the relative position of a flow path, the term "forward" refers to a position which is closer to a reservoir 110 in the moving path of a working fluid, and the term "backward" refers to a position which is more distant from the reservoir. The same applies to a case where flow paths are directly connected as well as a case where flow paths are spaced apart from each other.

Figure 3:
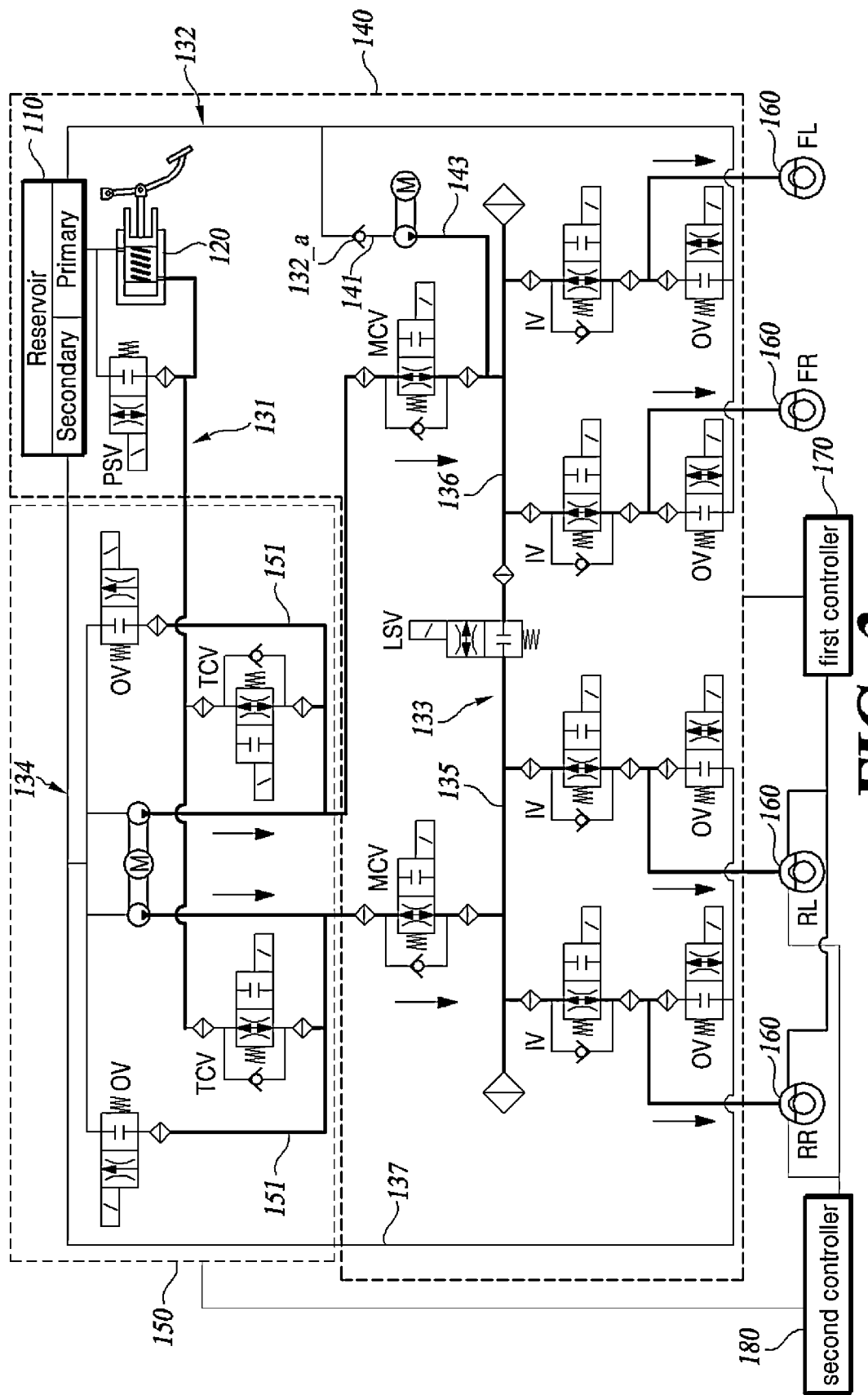
FIG. 3 is a block diagram illustrating a state in which a primary brake unit, a secondary brake unit, and a rear-wheel electric motor brake of a brake apparatus for a vehicle according to an embodiment of the present disclosure are not normally operated and a master cylinder is pressurized.
Figure 4:
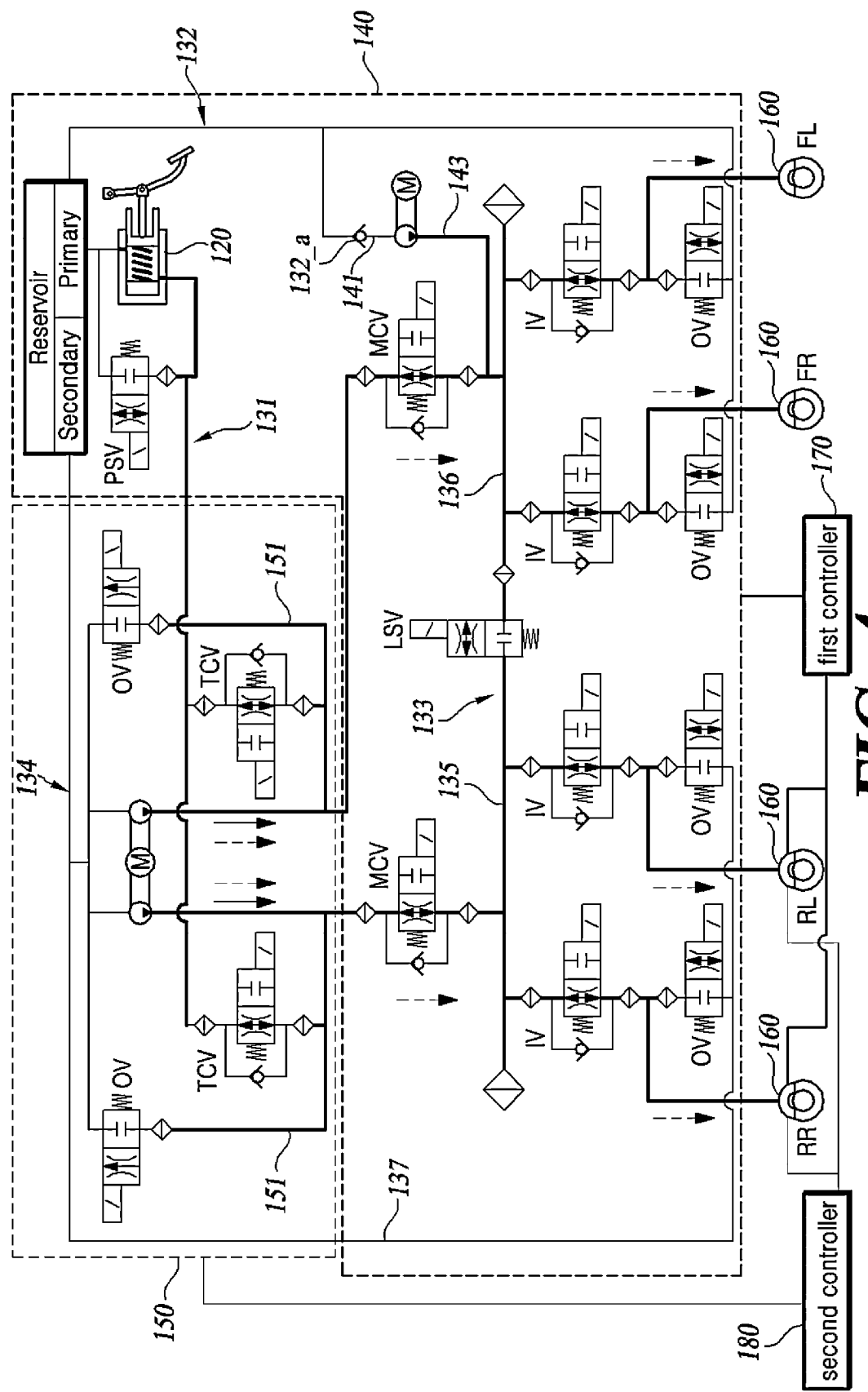
FIG. 4 is a block diagram illustrating a state in which the primary brake unit of the brake apparatus for the vehicle according to an embodiment of the present disclosure is not normally operated, the secondary brake unit and the rear-wheel electric motor brake are normally operated, and the master cylinder is pressurized.

Further, FIGS. 3 and 4 of the present disclosure schematically show a path where the hydraulic pressure of working fluid for supplying a braking force is transmitted, with thick or middle lines. Thus, it should be noted that, even if it is not indicated as a path for providing hydraulic pressure, some of the working fluid may flow into paths other than the indicated path.

Although the brake apparatus of FIGS. 2 to 11 is shown and described as an H-split type in which a front left wheel and a front right wheel are simultaneously controlled, and a rear left wheel and a rear right wheel are simultaneously controlled, a hydraulic-pressure distribution structure may be freely changed without being limited thereto.

Further, as shown in FIGS. 2 to 11 of the present disclosure, the inclusion of a valve having any function in claims has the meaning of having a single valve with such a function as well as the meaning of having a plurality of valves with such a function.

A brake apparatus for a vehicle according to an embodiment of the present disclosure includes some or all of a reservoir 110, a pump housing 100, a single chamber master cylinder 120, a hydraulic circuit 130, a primary brake unit 140, a secondary brake unit 150, a first valve LSV, a second valve MCV, a third valve 132_a, and a fourth valve TCV.

Referring to FIGS. 1 to 11, the reservoir 110 is configured to store a working fluid therein. The reservoir 110 according to an embodiment of the present disclosure is installed on the circumferential surface of a pump housing 100. This reduces the installation space of the brake apparatus. The reservoir 110 may supply the working fluid to the hydraulic circuit 130, a wheel brake 160, and other components included in the brake apparatus for the vehicle. The reservoir 110 receives the working fluid sent from a cylinder of the wheel brake 160 to reduce hydraulic pressure acting on the cylinder of the wheel brake 160. The reservoir 110 may have a narrow width to secure the installation space of other components, and may be installed on the circumferential surface of the pump housing 100 such that the circumferential direction of the pump housing 100 matches the longitudinal direction of the reservoir 110. In other words, the reservoir 110 may be installed to be parallel to a surface of the pump housing 100.

The pump housing 100 is connected to the reservoir 110. The hydraulic circuit 130 connected to the wheel brake 160 may be formed in the pump housing 100. The wheel brake may include at least one of Rear Right (RR) wheel, Rear Left (RL) wheel, Front Right (FR) wheel or Front Left (FL) wheel. A primary brake motor and a secondary brake motor which will be described later may be disposed on one side of the pump housing 100, and the first controller 170 and the second controller 180 may be disposed on the wheel brake 160 on the other side of the pump housing 100. Here, the pump housing 100 refers to a functional unit which is connected to the reservoir 110 and forms the hydraulic circuit 130 for braking the vehicle. For example, two blocks are assembled to provide the pump housing 100 which performs the above-described function.

The master cylinder 120 may include a pressurizer configured to create a hydraulic pressure in the chamber. For example, this may include a pedal rod which is configured to pressurize the chamber by a driver's pedal stroke. Here, an operation by the pedal stroke includes a configuration in which the pedal rod connected to the pedal pressurizes a piston in the chamber by the driver's pedal stroke as well as a case in which the driver's pedal stroke generates an electric signal to operate the pressurizer. The pressurizer may be a spindle configured to move a piston installed in the master cylinder 120.

In the brake apparatus for the vehicle according to an embodiment of the present disclosure, the single chamber master cylinder 120 is connected to the reservoir 110. That is, one chamber is eliminated from the master cylinder 120 having two chambers, and the secondary brake unit 150 is installed at an installation position where the chamber is eliminated. By using the single chamber master cylinder 120 instead of the master cylinder 120 having a plurality of chambers to have a long length, it is possible to reduce the entire weight of the brake apparatus and secure the installation position of the secondary brake unit 150 on the front of the master cylinder 120 in the axial direction thereof. Further, by reducing the length of a suction line through which the secondary brake unit 150 sucks the working fluid from the master cylinder 120, the braking response performance of the secondary brake unit 150 can be improved. As the volume of the chamber in the master cylinder 120 is reduced, the flow rate of the deliverable working fluid may be reduced. However, the motor of the secondary brake unit 150 may perform compensation, and operate to maintain the performance for reducing or increasing the pressure of the brake apparatus.

Referring to FIG. 1, at least a portion of the secondary brake unit 150 according to an embodiment of the present disclosure is disposed on the front of the master cylinder 120 in the axial direction thereof. Here, the front in the axial direction refers to a direction where the piston of the master cylinder 120 pressurizes the fluid in the chamber. To be more specific, a secondary brake motor may be installed on a surface of the pump housing 100 on the front of the master cylinder 120 in the axial direction thereof. Thus, this has an effect of reducing the volume of the brake apparatus for the vehicle which implements a redundancy function. Further, the secondary brake unit 150 is in the proximity of the master cylinder 120, thus reducing a time when the working fluid is transmitted from the master cylinder 120 to the secondary brake unit 150.

At least a portion of the primary brake unit 140 according to an embodiment of the present disclosure is disposed on a position perpendicular to the axial direction of the master cylinder 120. For example, the primary brake motor may be installed at a position perpendicular to the axial direction on the master cylinder 120 on a surface of the pump housing 100. Thus, the primary brake unit 140 may be disposed at a position which does not overlap with the installation position of the secondary brake unit 150 for a redundancy braking function.

When the master cylinder 120 is disposed to be adjacent to the reservoir 110, the secondary brake unit 150 installed on the front of the master cylinder 120 is also adjacent to the reservoir 110, and time for the working fluid to be transmitted from the reservoir 110 to the secondary brake unit 150 is reduced.

The hydraulic circuit 130 is connected to the wheel brake 160. An end of the hydraulic circuit 130 may communicate with the cylinder of the wheel brake 160. The hydraulic circuit 130 may be connected to an accumulator, a pump, the master cylinder 120, the reservoir 110, and the like, which temporarily store the working fluid discharged from the wheel brake cylinder as well as the wheel brake 160. One or more valves are installed in the hydraulic circuit 130 to control the flow of the fluid and the hydraulic pressure acting on the hydraulic circuit 130 and each component connected to the hydraulic circuit 130.

To be more specific, the hydraulic circuit 130 includes a first hydraulic circuit 131 coupled to the reservoir 110, the master cylinder 120, and the secondary brake unit 150. The hydraulic circuit 130 also includes a second hydraulic circuit 132 coupled to the reservoir 110 and the primary brake unit 140. In addition, the hydraulic circuit 130 includes a third hydraulic circuit 133 coupled to the primary brake unit 140, the secondary brake unit 150, and the wheel brake 160. The third hydraulic circuit 133 communicates with the primary brake unit 140, the secondary brake unit 150, and the wheel brake 160. When the primary brake unit 140 malfunctions, the secondary brake unit 150 connected via the third hydraulic circuit 133 to the wheel brake 160 provides a braking force to the wheel brake 160 in response to a hydraulic braking signal generated by the controller. Thus, the cylinder of the wheel brake 160 of the brake apparatus for the vehicle according to the present disclosure may be decompressed or pressurized by at least one of the secondary brake unit 150 and the primary brake unit 140.

The third hydraulic circuit 133 according to an embodiment of the present disclosure includes a first hydraulic line 135 coupled to a first portion of the wheel brakes 160, and a second hydraulic line 136 coupled to a second portion of the wheel brakes 160. In order to selectively separate a hydraulic pressure applied to the first hydraulic line 135 and the second hydraulic line 136, a first valve LSV is further provided. By the first valve LSV, the working fluid pressurized in the secondary brake unit 150 or the primary brake unit 140 may be selectively transmitted to all or some of the first hydraulic line 135 and the second hydraulic line 136. Alternatively, the hydraulic pressure of the working fluid applied to the first hydraulic line 135 and the second hydraulic line 136 may be controlled. The first valve LSV may be referred to as a main control valve MCV. Thus, it is possible to more precisely control braking pressure transmitted to each wheel of the vehicle.

The brake apparatus for the vehicle according to an embodiment of the present disclosure further includes a second valve MCV which is coupled to the first hydraulic circuit 131 and the third hydraulic circuit 133, and is configured to control the hydraulic pressure of the first hydraulic circuit 131 and the third line. When the second valve MCV is closed, the secondary brake unit 150 and the master cylinder 120 do not communicate with the wheel brake 160, and only the primary brake unit 140 transmits the hydraulic pressure to the wheel brake 160. At this time, the hydraulic pressure applied to the wheel brake 160 is applied by the primary brake unit 140. When the second valve MCV is partially or completely opened, the hydraulic pressure generated in the secondary brake unit 150 or all or part of the master cylinder and the primary brake unit 140 may be transmitted to the wheel brake. Furthermore, by adjusting the opening degree of the valve, the hydraulic pressure between the first hydraulic circuit 131 and the third hydraulic circuit 133 may be controlled. The number of the second valves MCV corresponding to the number of discharge lines of the secondary brake unit 150 may be installed. Thus, it is possible to adjust the hydraulic line of each discharge line.

The primary brake unit 140 of the present disclosure has a single suction line 141 and a single discharge line 143. In this regard, the suction line 141 refers to a line through which the working fluid is sucked to an actuator of the primary brake unit 140, while the discharge line 143 refers to a line through which the working fluid is discharged from the actuator of the primary brake unit 140. Even if the primary brake unit 140 has the single discharge line, it is possible to adjust the hydraulic pressure applied to the front and rear wheels of the vehicle by the above-described second valve MCV.

The second hydraulic circuit 132 according to an embodiment of the present disclosure is equipped with a third valve 132_a to prevent the working fluid from flowing backward to the reservoir 110. An intended hydraulic pressure may be transmitted to each wheel by the third valve 132_a.

The primary brake unit 140 of the brake apparatus for the vehicle according to an embodiment of the present disclosure is in fluid communication with the wheel brake 160. The hydraulic pressure of the fluid pressurized by the primary brake unit 140 may be transmitted via the above-described second valve MCV to the wheel brake 160.

The brake apparatus for the vehicle according to an embodiment of the present disclosure further includes the fourth hydraulic circuit 134 which connects an auxiliary inflow line 137 along which the working fluid is discharged to enter the secondary brake unit 150, and the reservoir 110. The auxiliary inflow line 137 refers to a path along which the working fluid flows into the secondary brake unit 150. By the fourth hydraulic circuit 134 connecting the auxiliary inflow line 137 and the reservoir 110, it is possible to rapidly reduce the hydraulic pressure of the auxiliary inflow line 137. Thus, it is possible to increase the reaction speed for reducing a pressure on the side of the wheel brake 160.

The secondary brake unit 150 is connected to a plurality of auxiliary discharge lines 151 along which the working fluid is discharged. The plurality of auxiliary discharge lines 151 and at least some of the wheel brake 160 communicate with each other. The brake apparatus for the vehicle according to an embodiment of the present disclosure is provided with a fourth valve TCV which is configured to apply a required braking pressure on the side of the wheel communicating with the plurality of discharge lines. The fourth valve TCV is normally opened, and controls the hydraulic pressure of the wheel brake 160 communicating with the fourth valve TCV.

The brake apparatus for the vehicle according to an embodiment of the present disclosure further includes an electromechanical brake mounted on at least one wheel. The electromechanical brake allows the brake apparatus for the vehicle to have a redundancy braking function, and the hydraulic pressure created by the primary brake unit 140 and the secondary brake unit 150 of the present disclosure and the hydraulic pressure created by the electromechanical brake are added, thus allowing the brake apparatus for the vehicle to be accurately controlled in various ways.

The brake apparatus for the vehicle according to an embodiment of the present disclosure includes a first controller 170 which controls the primary brake unit 140 and the secondary brake unit 150, and a second controller 180 which controls the secondary brake unit 150. When there is no problem in the primary brake unit 140 or the secondary brake unit 150, but a problem occurs in a main controller for controlling the primary brake unit 140 or an auxiliary controller for controlling the secondary brake unit 150, a redundancy system of the brake apparatus may not be normally implemented. Thus, the brake apparatus for the vehicle according to an embodiment of the present disclosure has two controllers. Here, the expression "the brake unit is controlled" includes the case of controlling the driving state of a valve installed in the hydraulic circuit 130 which is included in or connected to the brake unit. The present disclosure is not limited to a case where the first controller 170 controls only the primary brake unit 140. The first controller 170 may be configured to control both the primary brake unit 140 and the secondary brake unit 150.

On the other hand, the second controller 180 according to an embodiment of the present disclosure may control the primary brake unit 140 and the secondary brake unit 150 independently of the first controller 170. Since the primary brake unit 140 and the secondary brake unit 150 are controlled by separate controllers, the brake apparatus may be controlled such that a remaining controller properly performs the braking function of the vehicle even if there occurs a problem in one controller.

For example, a case where the first controller 170 controls the primary brake unit 140 and the second controller 180 controls the secondary brake unit 150 independently of the first controller 170 will be described. When a problem occurs in the first controller 170, the second controller 180 may control the secondary brake unit 150 such that the secondary brake unit 150 brakes the vehicle. In contrast, when a problem occurs in the second controller 180, the primary brake unit 140 controlled by the first controller 170 may be operated to brake the vehicle.

If there occurs the problem in the first controller 170 or the second controller 180, the controller in which the problem occurs may transmit a signal indicating that the problem has occurred to the normally operating controller. The normally operating controller may receive a signal indicating that the problem has occurred from the controller in which the problem occurs.

At least one of the first controller 170 and the second controller 180 of the brake apparatus for the vehicle according to an embodiment of the present disclosure is configured to control the electromechanical brake mounted on the wheel. At least one of the first controller 170 and the second controller 180 may control a hydraulic brake and an electromechanical brake, respectively, thus making it possible to control a total pressure of the braking pressure applied by the hydraulic brake to the wheel equipped with the electromechanical brake and the braking pressure applied by the electromechanical brake. Further, since it is unnecessary to provide a separate controller which controls the electromechanical brake, an installation volume can be reduced.

The controller may be formed of a printed circuit board on which electronic elements for controlling the rotation of the motor and the opening and closing of a solenoid valve are printed.

Hereinafter, the operating mechanism of the above-described brake apparatus for the vehicle will be described.

FIG. 3 is a block diagram illustrating a state in which the primary brake unit 140, the secondary brake unit 150, and a rear-wheel electric motor brake of the brake apparatus for the vehicle according to an embodiment of the present disclosure are not normally operated and the master cylinder 120 is pressurized.

Referring to FIG. 3, when the primary brake unit 140 and the secondary brake unit 150 are not operated and all control valves are not in operation, hydraulic pressure is generated in a pedal master cylinder due to a pedal stroke, and the hydraulic pressure generated by the pedal stroke is transmitted via the first hydraulic circuit 131 and the third hydraulic circuit 133 to a wheel cylinder.

FIG. 4 is a block diagram illustrating a state in which the primary brake unit 140 of the brake apparatus for the vehicle according to an embodiment of the present disclosure is not normally operated, the secondary brake unit 150 and the rear-wheel electric motor brake are normally operated, and the master cylinder 120 is pressurized.

Referring to FIG. 4, in the brake apparatus for the vehicle according to an embodiment of the present disclosure, when the secondary brake unit 150 and the rear-wheel electromechanical brake are operated and the pedal stroke generates hydraulic pressure in the master cylinder 120, working fluid is transmitted from the reservoir 110 to the first hydraulic circuit 131. The working fluid transmitted to the first hydraulic circuit 131 is delivered via the second hydraulic circuit 132 and the third hydraulic circuit 133 to the cylinder of the wheel brake 160. Therefore, a braking force is generated by the secondary brake unit 150 and the pedal stroke.

FIGS. 5 to 9 are block diagrams illustrating a state in which only the primary brake unit 140 is normally operated, and the secondary brake unit 150 and the rear-wheel electromechanical brake are not normally operated.

Figure 5:
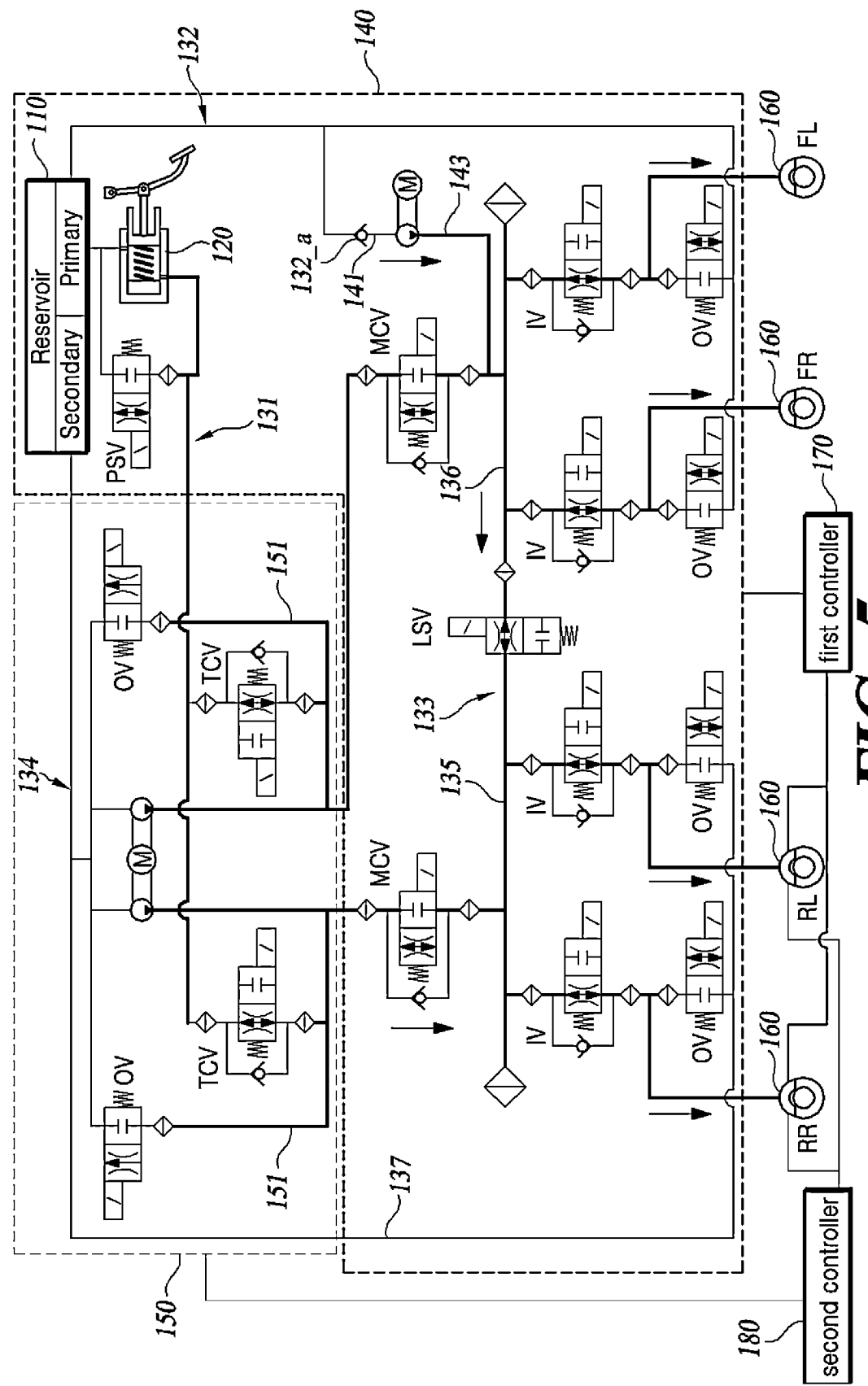
FIG. 5 is a block diagram illustrating a state in which the master cylinder is pressurized when only the primary brake unit of the brake apparatus for the vehicle according to an embodiment of the present disclosure is normally operated.

FIG. 5 is a block diagram illustrating a state in which the master cylinder 120 is pressurized when only the primary brake unit 140 of the brake apparatus for the vehicle according to an embodiment of the present disclosure is normally operated.

Referring to FIG. 5, when the master cylinder 120 is pressurized by the pedal stroke, hydraulic pressure pressurized by the pedal and hydraulic pressure of the working fluid pressurized from the reservoir 110 through the primary brake unit 140 are distributed to a first path and a second path by a low-pressure switching valve LSV, and braking pressure is provided to the wheel brake 160.

Figure 6:
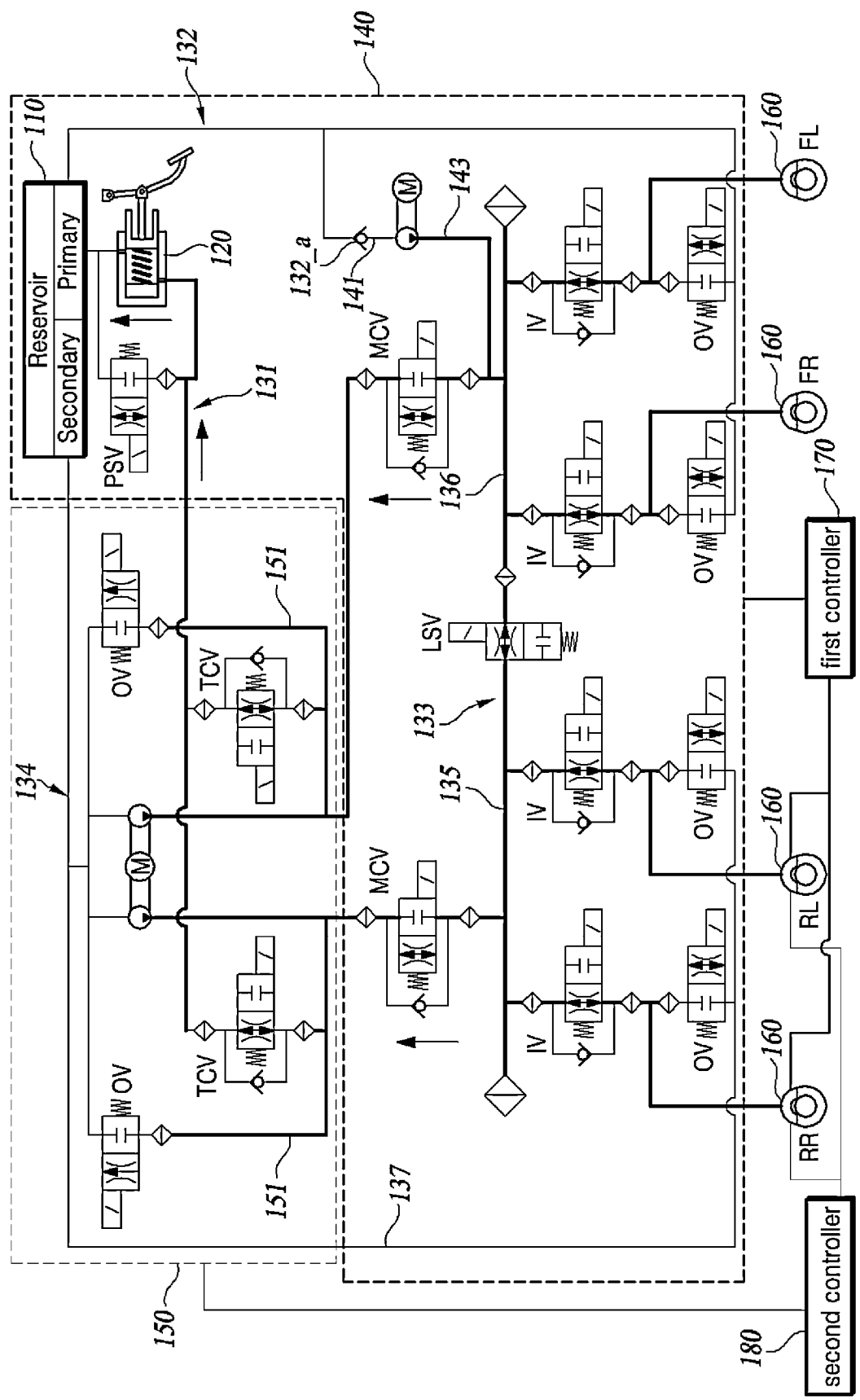
FIG. 6 is a block diagram illustrating a state in which a master cylinder is decompressed when only a primary brake unit of a brake apparatus for a vehicle according to another embodiment of the present disclosure is normally operated.

FIG. 6 is a block diagram illustrating a state in which a master cylinder 120 is decompressed when only a primary brake unit 140 of a brake apparatus for a vehicle according to another embodiment of the present disclosure is normally operated.

Referring to FIG. 6, when the master cylinder 120 is decompressed, working fluid may be sucked from the wheel brake 160 through the third hydraulic circuit 133 and the first hydraulic circuit 131 into the master cylinder 120. The sucked working fluid is stored in the reservoir 110 communicating with the master cylinder, so the hydraulic pressure of the wheel brake 160 is reduced.

Figure 7:
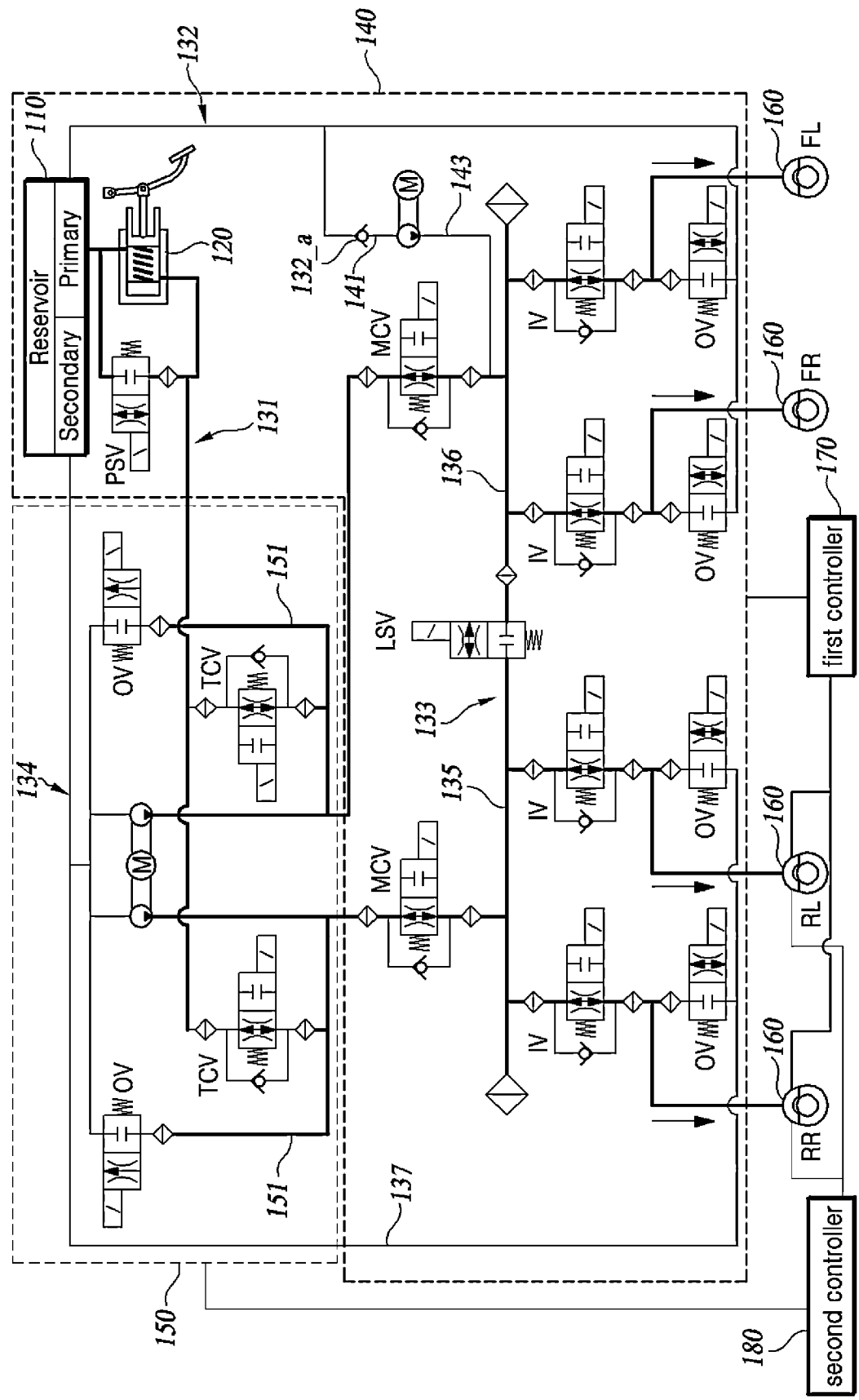
FIG. 7 is a block diagram illustrating a state in which an outlet valve is opened when only a primary brake unit of a brake apparatus for a vehicle according to a further embodiment of the present disclosure is normally operated.

FIG. 7 is a block diagram illustrating a state in which an outlet valve is opened when only a primary brake unit 140 of a brake apparatus for a vehicle according to a further embodiment of the present disclosure is normally operated.

Referring to FIG. 7, if the master cylinder 120 is decompressed when the primary brake unit 140 of the brake apparatus for the vehicle according to an embodiment of the present disclosure is normally operated and the secondary brake unit 150 is not operated, an outlet valve on the wheel brake is opened and working fluid is transmitted from the wheel brake through the second hydraulic circuit 132 to the reservoir 110, so the hydraulic pressure acting on the wheel brake 160 may be reduced.

Figure 8:
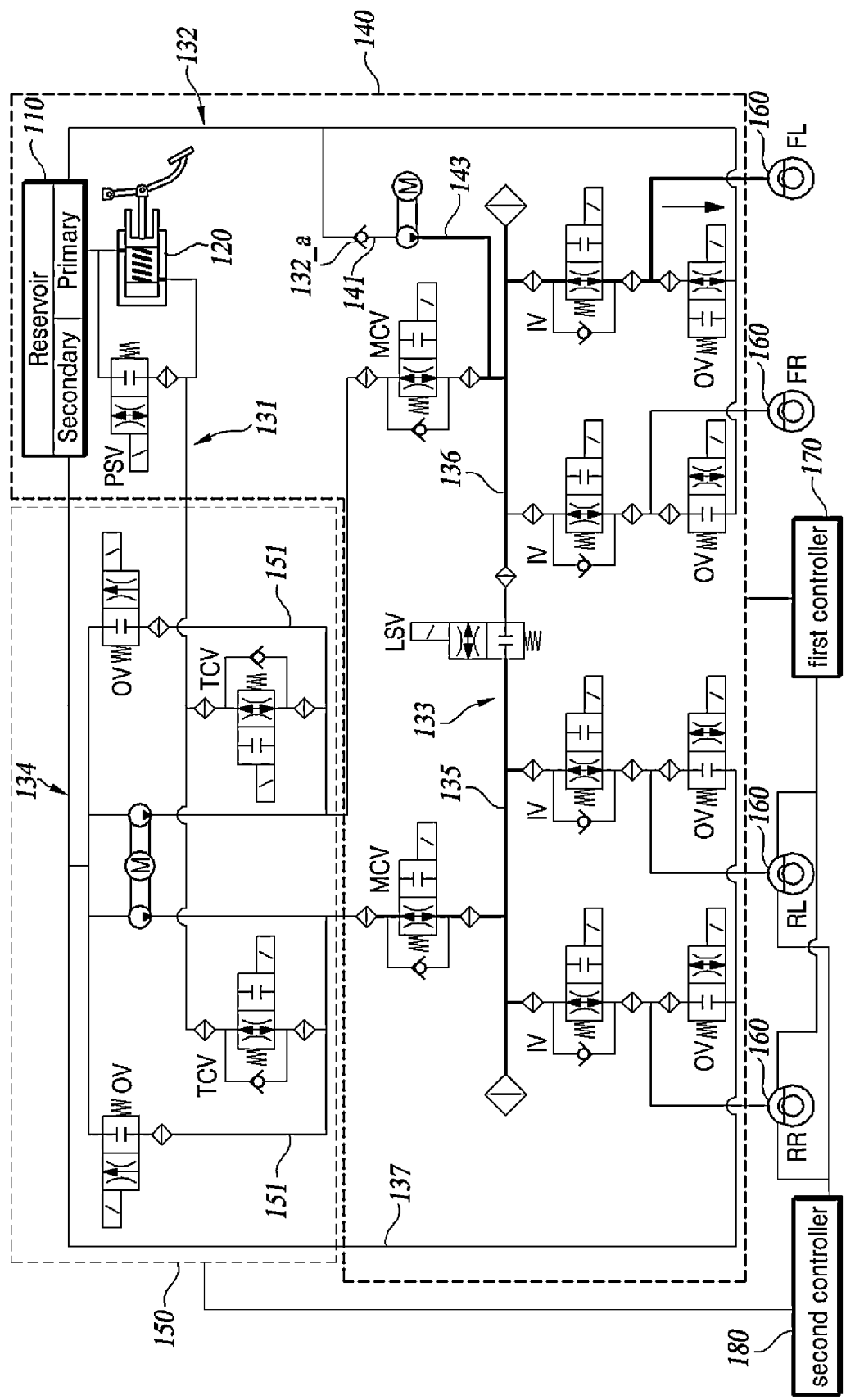
FIG. 8 is a block diagram illustrating a state in which a braking pressure is transmitted from a primary brake unit to only one wheel when only the primary brake unit of a brake apparatus for a vehicle according to another embodiment of the present disclosure is normally operated.

FIG. 8 is a block diagram illustrating a state in which braking pressure is transmitted from a primary brake unit 140 to only one wheel FL when only the primary brake unit 140 of a brake apparatus for a vehicle according to another embodiment of the present disclosure is normally operated.

Referring to FIG. 8, the brake apparatus for the vehicle according to an embodiment of the present disclosure may transmit braking pressure to the single wheel brake 160, by closing a low-pressure switching valve and closing one of inlet valves disposed in the hydraulic line on a side close to the primary brake unit 140. The present disclosure is not limited thereto. When the low-pressure switching valve is opened and a vehicle has four wheels RR, RL, FR, and FL, braking pressure may be transmitted to one wheel brake FL by closing the inlet valves on the three wheels RR, RL, and FR.

Figure 9:
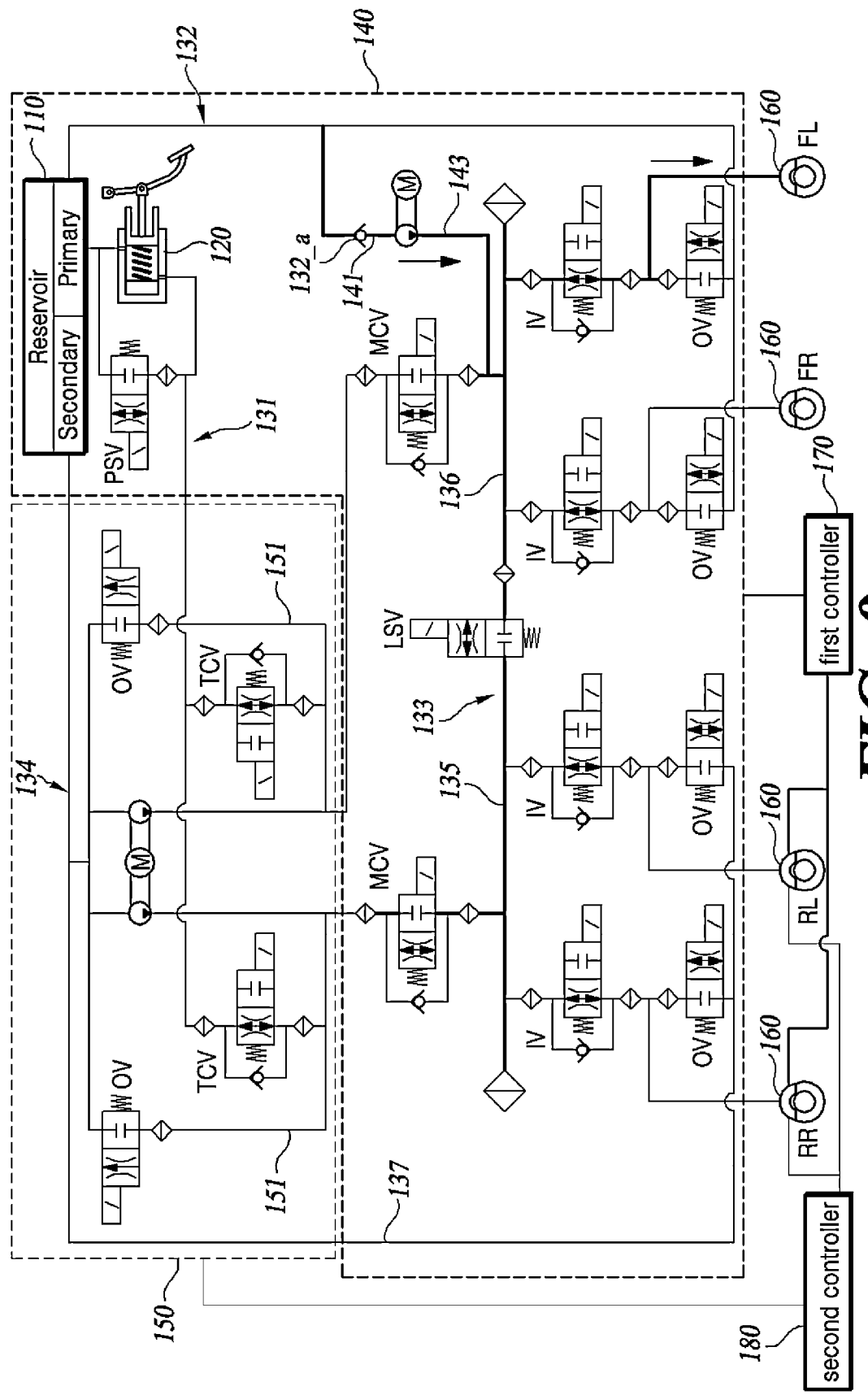
FIG. 9 is a block diagram illustrating a state in which the braking pressure of only one wheel is reduced when only a primary brake unit of a brake apparatus for a vehicle according to another embodiment of the present disclosure is normally operated.

FIG. 9 is a block diagram illustrating a state in which the braking pressure of only one wheel is reduced when only a primary brake unit 140 of a brake apparatus for a vehicle according to another embodiment of the present disclosure is normally operated.

Referring to FIG. 9, the brake apparatus for the vehicle according to an embodiment of the present disclosure may reduce the pressure of the single wheel brake 160, by closing a low-pressure switching valve and opening one of outlet valves disposed in the hydraulic line on a side close to the primary brake unit 140. The present disclosure is not limited thereto. When the low-pressure switching valve is opened and a vehicle has four wheels, braking pressure may be transmitted to one wheel brake by closing the outlet valve on one wheel.

Figure 10:
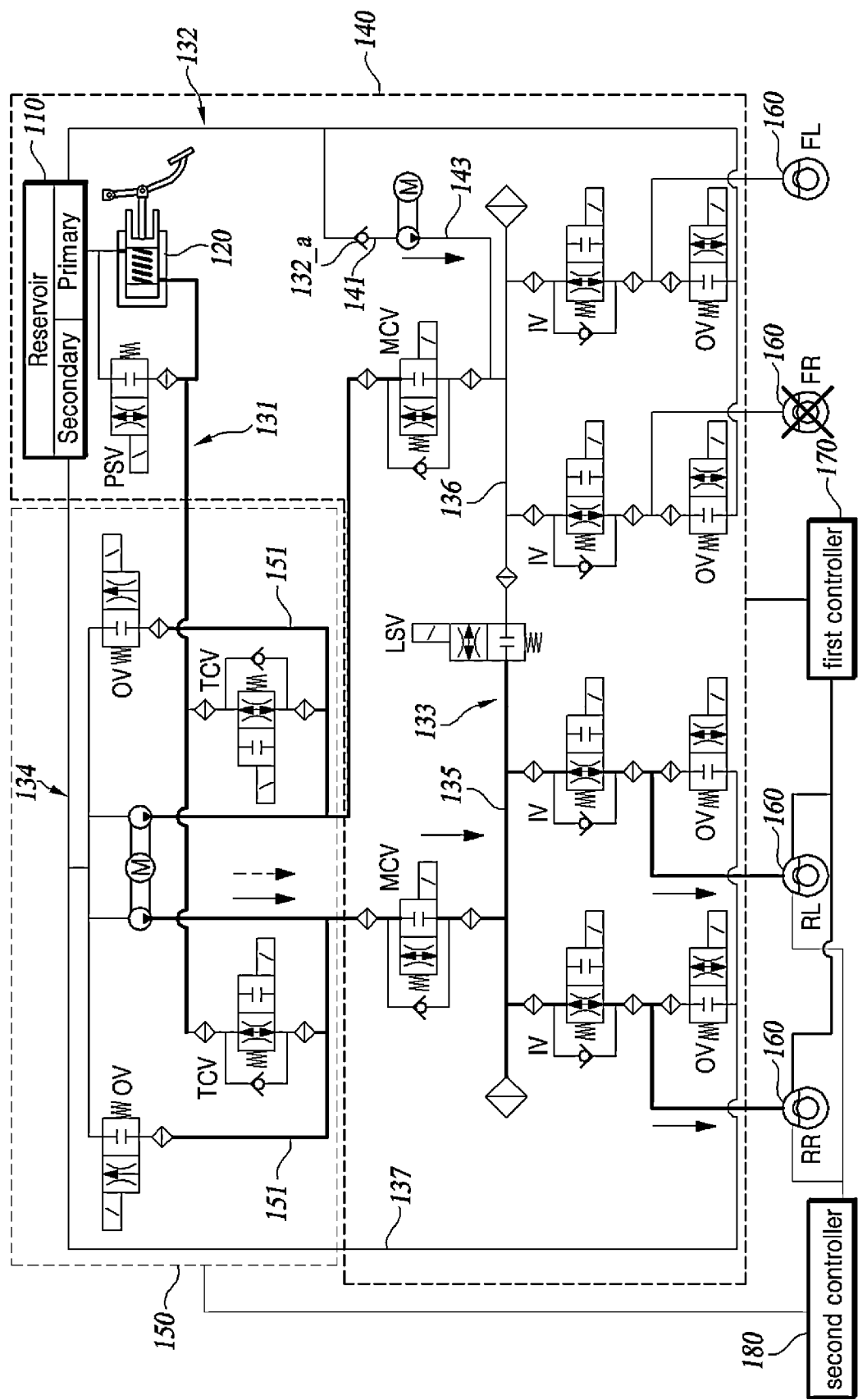
FIG. 10 is a block diagram illustrating a state in which the braking pressure of a rear wheel is increased when a primary brake unit, a secondary brake unit, and a rear-wheel electromechanical brake of a brake apparatus for a vehicle according to another embodiment of the present disclosure are normally operated.

FIG. 10 is a block diagram illustrating a state in which the braking pressure of a rear wheel is increased when a primary brake unit 140, a secondary brake unit 150, and a rear-wheel electromechanical brake of a brake apparatus for a vehicle according to another embodiment of the present disclosure are normally operated.

Referring to FIG. 10, when the wheel brake mounted on at least one of front wheels on left and right sides is abnormally operated, only an actuator which is close to the rear wheel among actuators of the secondary brake unit 150 is operated and a main control valve which is close to the front wheel is closed, so that braking pressure may be transmitted to rear wheels on left and right sides. Thus, it is possible to brake the rear wheels.

Figure 11:
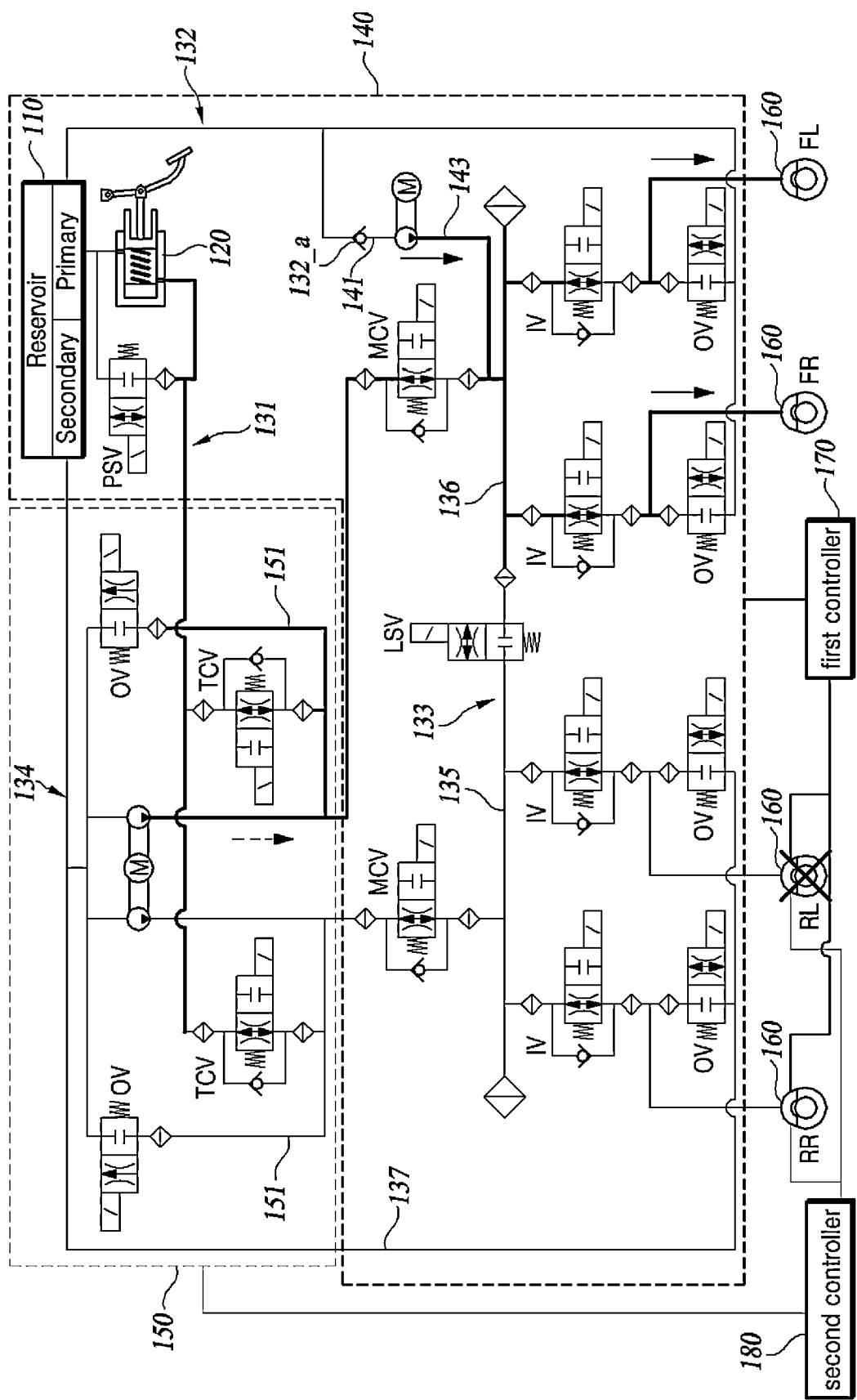
FIG. 11 is a block diagram illustrating a state in which the braking pressure of a front wheel is increased when a primary brake unit, a secondary brake unit, and a rear-wheel electromechanical brake of a brake apparatus for a vehicle according to another embodiment of the present disclosure are normally operated.

FIG. 11 is a block diagram illustrating a state in which the braking pressure of a front wheel is increased when a primary brake unit 140, a secondary brake unit 150, and a rear-wheel electromechanical brake of a brake apparatus for a vehicle according to another embodiment of the present disclosure are normally operated.

Referring to FIG. 11, when the wheel brake mounted on at least one of rear wheels on left and right sides is abnormally operated, only an actuator which is close to the front wheel among actuators of the secondary brake unit 150 is operated and a main control valve which is close to the rear wheel is closed, so that braking pressure of working fluid pressurized by the secondary brake unit 150 may be transmitted to front wheels on left and right sides. Further, the braking pressure of the working fluid pressurized by the primary brake unit 140 may be transmitted to the front wheels by actuating the primary brake unit 140. Thus, it is possible to brake the front wheels.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A brake apparatus for a vehicle, comprising:
   a reservoir configured to store a working fluid;
   a master cylinder connected to the reservoir;
   a hydraulic circuit connected to wheel brakes of the vehicle;
   a primary brake unit configured to supply a hydraulic pressure to the wheel brakes through the hydraulic circuit; and
   a secondary brake unit configured to supply a hydraulic pressure to the wheel brakes through the hydraulic circuit,
   wherein the hydraulic circuit comprises:
      a first hydraulic circuit coupled to the reservoir, the master cylinder, and the secondary brake unit;
      a second hydraulic circuit coupled to the reservoir and the primary brake unit; and
      a third hydraulic circuit coupled to the primary brake unit, the secondary brake unit, and the wheel brakes,
   and further comprising:
      a first controller configured to control the primary brake unit and the secondary brake unit; and
      a second controller configured to control the primary brake unit and the secondary brake unit independently of the first controller.

2. The brake apparatus of claim 1, wherein at least a portion of the secondary brake unit is disposed in front of the master cylinder.

3. The brake apparatus of claim 1, wherein at least a portion of the primary brake unit is disposed at a position perpendicular to an axial direction of the master cylinder.

4. The brake apparatus of claim 1, wherein the third hydraulic circuit comprises:
   a first hydraulic line coupled to a first portion of the wheel brakes;
   a second hydraulic line coupled to a second portion of the wheel brakes; and a valve configured to selectively separate a hydraulic pressure of the first hydraulic line and the second hydraulic line.

5. The brake apparatus of claim 1, further comprising a valve coupled to the first hydraulic circuit and the third hydraulic circuit, and configured to control a hydraulic pressure between the first hydraulic circuit and the third hydraulic circuit.

6. The brake apparatus of claim 1, wherein the primary brake unit has a main suction line and a main discharge line.

7. The brake apparatus of claim 1, further comprising a valve disposed at the second hydraulic circuit and configured to prevent the working fluid from flowing backward from the primary brake unit to the reservoir.

8. The brake apparatus of claim 1, wherein the primary brake unit is in fluid communication with the wheel brakes.

9. The brake apparatus of claim 1, further comprising:
an auxiliary inflow line configured to discharge the working fluid to the secondary brake unit; and
a fourth hydraulic circuit connecting the auxiliary inflow line and the reservoir.

10. The brake apparatus of claim 1, further comprising:
a plurality of auxiliary discharge lines coupled to the second brake unit and configured to discharge the working fluid; and
a valve disposed at the plurality of auxiliary discharge lines and configured to apply a predetermined braking pressure on the wheel brake in communication with the plurality of auxiliary discharge lines.

11. The brake apparatus of claim 1, further comprising an electromechanical brake mounted on a wheel of the vehicle.

12. The brake apparatus of claim 1, further comprising:
a first controller configured to control the primary brake unit and the secondary brake unit; and
a second controller configured to control the secondary brake unit.

13. The brake apparatus of claim 12, further comprising an electromechanical brake mounted on a wheel of the vehicle, wherein at least one of the first controller and the second controller is configured to control the electromechanical brake.

* * * * *